United States Patent
Thompson

[19]

[11] Patent Number: 6,116,180
[45] Date of Patent: Sep. 12, 2000

[54] BOAT

[75] Inventor: Adrian Thompson, Maughold, United Kingdom

[73] Assignee: Paragon Mann Limited, Union Mills, United Kingdom

[21] Appl. No.: 08/896,709

[22] Filed: Jul. 18, 1997

Related U.S. Application Data

[63] Continuation of application No. 08/663,054, filed as application No. PCT/GB94/02740, Dec. 15, 1994, abandoned.

[30] Foreign Application Priority Data

Dec. 16, 1993 [GB] United Kingdom .................. 9325762

[51] Int. Cl.$^7$ ........................................................ B63B 1/00
[52] U.S. Cl. ........................................ 114/271; 114/56.1
[58] Field of Search .................................. 114/56, 67 A, 114/67 R, 271, 210, 310

[56] References Cited

U.S. PATENT DOCUMENTS

| | | | |
|---|---|---|---|
| 2,669,427 | 2/1954 | Dowrelio | 114/210 |
| 3,045,629 | 7/1962 | Farrington . | |
| 3,140,686 | 7/1964 | Olivotti | 114/56 |
| 3,261,319 | 7/1966 | Ellis | 114/210 |
| 5,184,561 | 2/1993 | Nickell, Jr. | 114/61 |

FOREIGN PATENT DOCUMENTS

| | | |
|---|---|---|
| 0 218 260 A2 | 4/1987 | European Pat. Off. . |
| 0 249 321 A2 | 12/1987 | European Pat. Off. . |
| 0 335 345 A2 | 4/1989 | European Pat. Off. . |
| 317-606 | 5/1989 | European Pat. Off. . |
| 0 392 019 | 10/1990 | European Pat. Off. . |
| 0 421 958 A2 | 10/1991 | European Pat. Off. . |
| 2522610 | 9/1983 | France ..................................... 114/56 |
| 57-44587 | 3/1982 | Japan . |
| 564653 | 10/1944 | United Kingdom . |
| 792317 | 3/1958 | United Kingdom . |
| 862749 | 3/1961 | United Kingdom . |
| 1060017 | 2/1967 | United Kingdom . |
| 1106441 | 3/1968 | United Kingdom . |
| 1298162 | 11/1972 | United Kingdom . |
| 1361936 | 7/1974 | United Kingdom . |
| 1545900 | 5/1979 | United Kingdom . |
| 2007615 | 5/1979 | United Kingdom . |
| 2024732 | 1/1980 | United Kingdom . |
| 2150890 | 7/1985 | United Kingdom . |
| 2236717 | 4/1991 | United Kingdom . |
| WO 88/09283 | 12/1988 | WIPO . |
| WO 89/11414 | 11/1989 | WIPO . |
| WO 91/08137 | 6/1991 | WIPO . |
| WO 92/17366 | 10/1992 | WIPO . |

OTHER PUBLICATIONS

"Aerodynamic hull shapes", *Motor Boat and Yachting*, vol. 115, No. 2383, Aug. 20, 1971, pp. 26–29.
"Vessel", *Patent Abstracts of Japan*, vol. 6, No. 117 (M–139) (995), Jun. 30, 1982.
Poster for Calendar 1993.
Amateur Photographer, Jun. 26, 1992.
Compilation from *Fairway Communications*, Summer 1992.
*Greenock Telegraph*, May 23, 1992.
*SeaWatch*, Summer 1992, No. 19.
"PowerFlite Fantastic", pp. 69–71 (publication date unknown).

*Primary Examiner*—Jesus D. Sotelo
*Attorney, Agent, or Firm*—Whitman Breed Abbott & Morgan LLP

[57] ABSTRACT

A boat comprises a central hull member (10), such member having no flat surfaces below the waterline such as could support the boat in a planing mode, the ratio of the length of such member to its beam being no less than 5 to 1, and a respective auxiliary member (12, 14) connected to each side of the central hull member and extending therealong, the auxiliary members extending to a lesser depth than the central hull member, the ratio of the beam of the boat to the beam of the central hull member being no more than two.

51 Claims, 6 Drawing Sheets

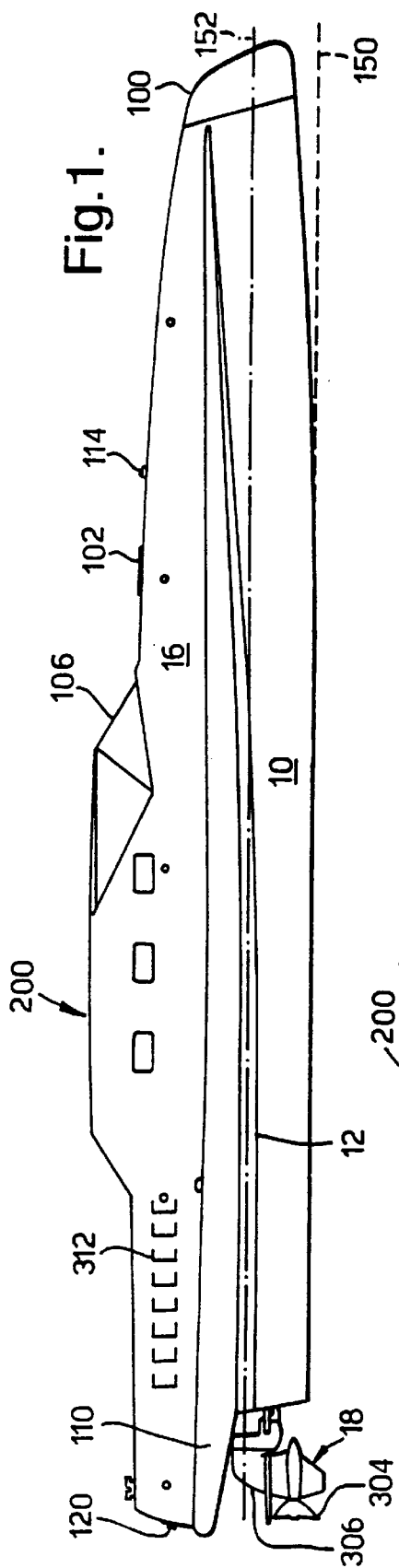
Fig.1.
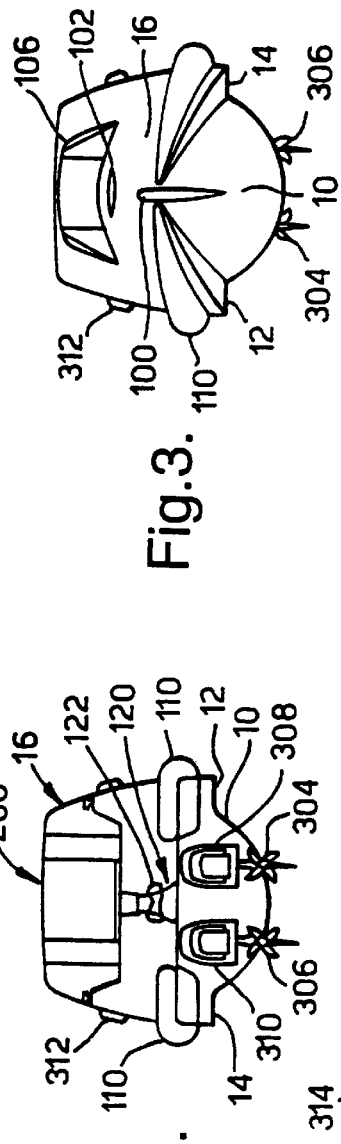
Fig.2.
Fig.3.
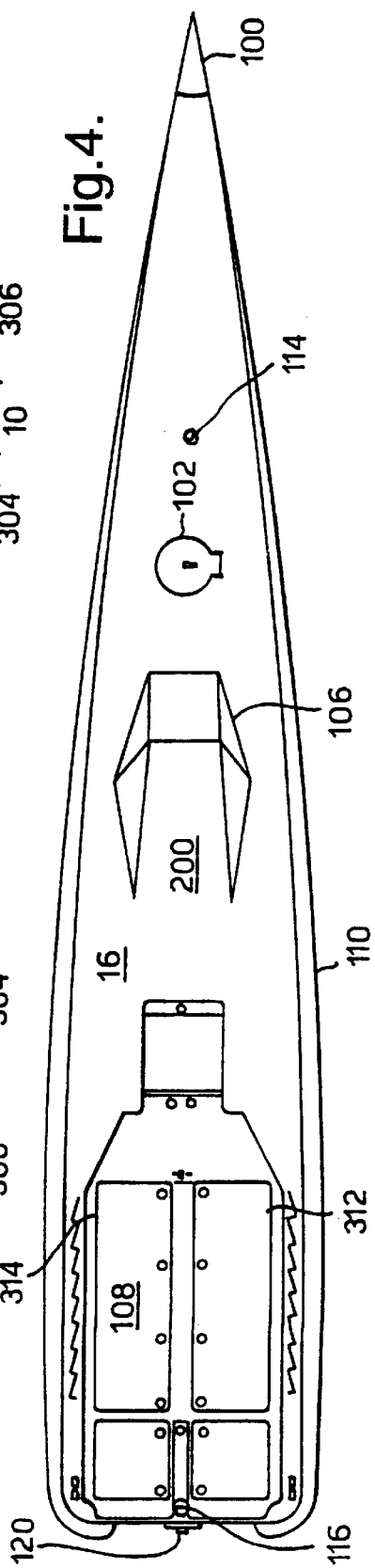
Fig.4.

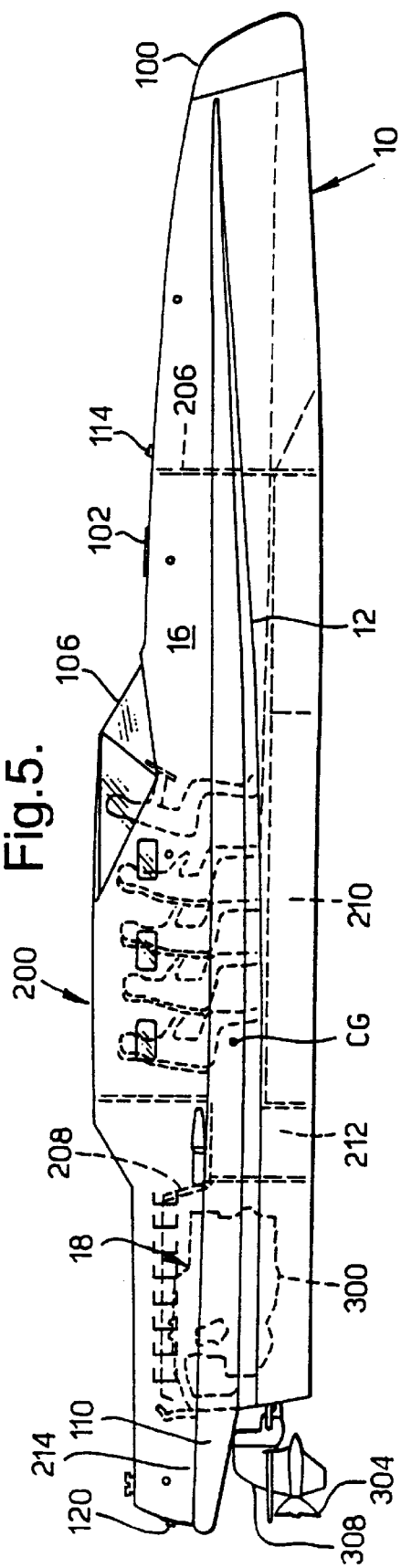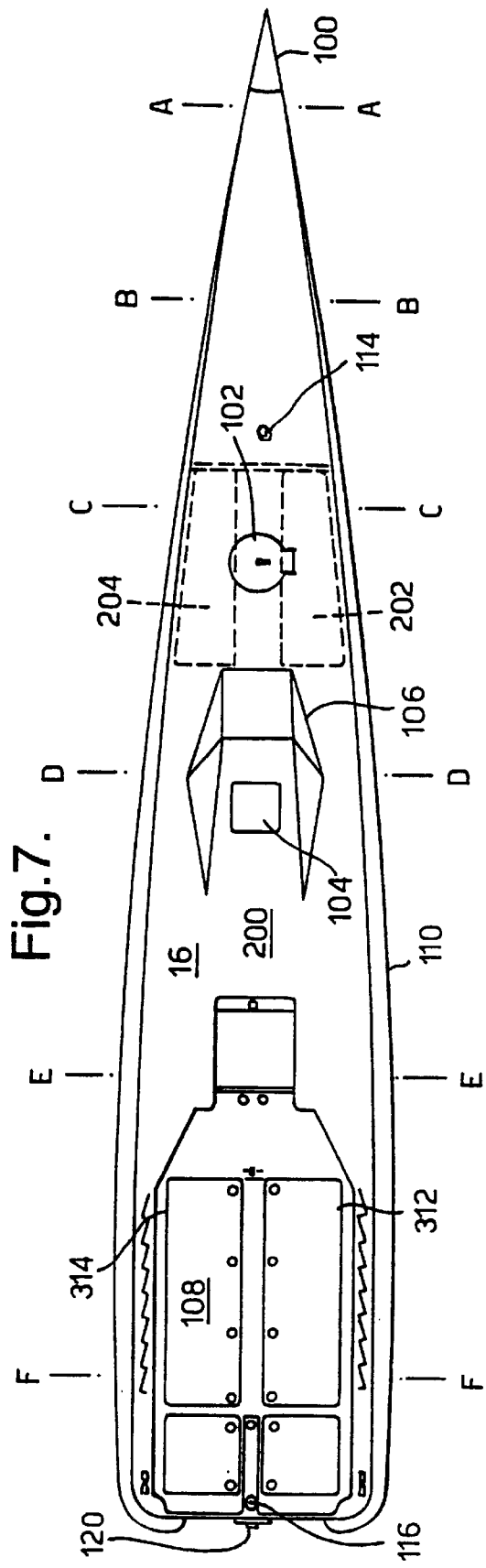

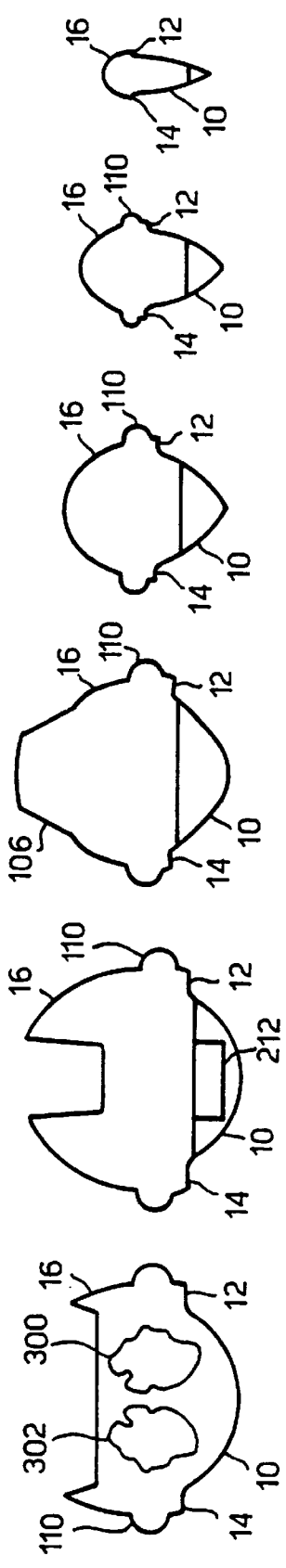
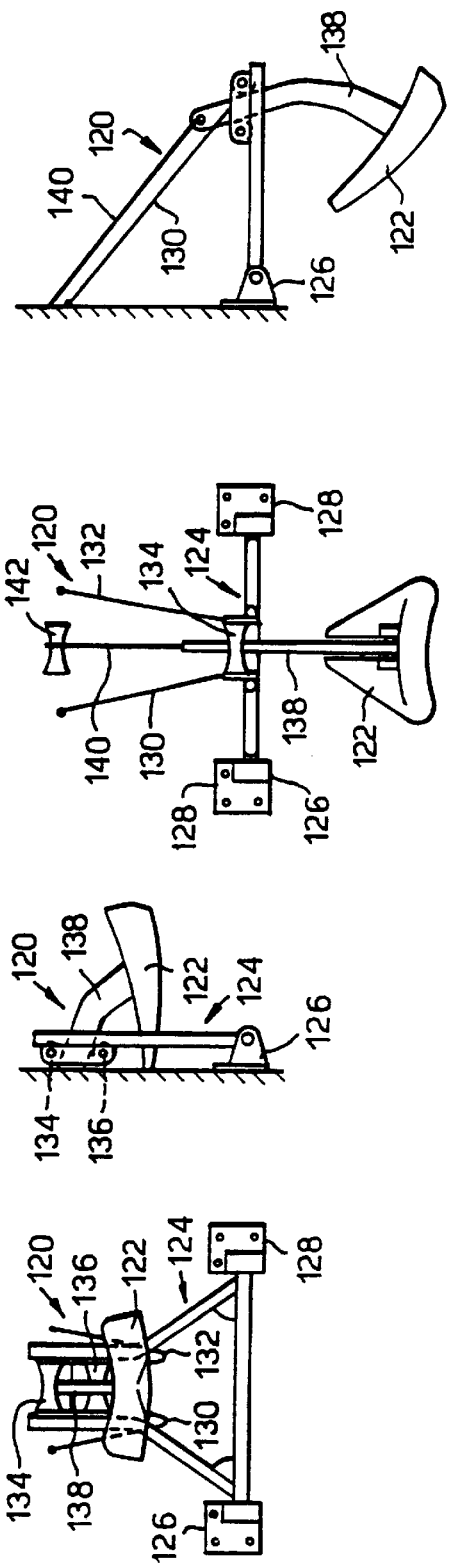

BOAT

This application is a continuation of application Ser. No. 08/663,054, filed Jun. 14, 1996, now abandoned, which is a 371 of PCT/GB94/02740 filed Dec. 15, 1994.

The present invention relates to a boat, and especially a boat capable of moving at high speeds with a long range and a large payload. Such a boat may be a fast patrol boat or a luxury cruiser or the like, and may typically have a length in the range of 10 to 50 meters and a displacement fully laden in the range of 1.5 to 400 metric tonnes. As a fast patrol boat, it might typically be used for Customs and Excise, Coast Guard, Fishery Protection, Military and Police duties.

Boats which are capable of operating in a planing mode are known. In such boats, especially near the stern where the weight of the boat is supported in the planing mode, the hull is usually "V" shaped in cross-section, each arm of the "V" being virtually flat and subtending an angle of less than 25 or 30 degrees to the horizontal, in order that planing can be sustained. For a planing boat, the volume of water displaced at rest is usually at least five or ten times the volume of water displaced when the boat is planing.

Such a planing boat suffers from several disadvantages. Firstly, it is uncomfortable to ride in, especially in high sea states. This is because when the bows hit a wave it has a tendency to "slam" into that wave, causing discomfort and possible injury to passengers. Secondly, this slamming behaviour can significantly reduce the life of the structure of the boat owing to the high structural stresses that it can cause. Thirdly, the boat may not behave uniformly well at all speeds. At very low speeds it may behave as a typical "displacement" boat, as discussed below. As such, it may ride fully in the water without displaying any planing behaviour. At high speeds, it may behave fully in a planing mode. However, at intermediate speeds, as it attempts to surmount its own bow wave in order to achieve the planing mode, its behaviour may be less predictable, since it may intermittently achieve and then fail to achieve the planing mode. Finally, for a given weight of boat, the power required to surmount the bow wave and achieve the planing mode is very significant. This power requirement can be a serious limiting factor on the amount of fuel carried and hence on the range of the boat.

An alternative to a planing boat is one which behaves in a displacement mode, in other words, a boat which behaves according to the displacement rule. Such boats do not display any significant planing behaviour, but rather have a maximum speed which is limited by the drag losses of the boat hull as it moves through the water. The displacement rule postulates that the maximum achievable speed (in knots) is proportional to the square root of the length of the boat (in feet). The constant of proportionality has been found empirically to lie usually between 1.3 and 1.6. Hence displacement boats have a speed which is limited by their length. The speed of such a boat is insufficient for the present requirement of a light manoeuvrable fast patrol boat or the like.

An alternative to a boat which behaves either in a displacement mode or a planing mode is one which behaves in a so-called "semi-displacement" mode. Such a boat is relatively slender (say, having a length to beam ratio (a "slenderness ratio") of greater than 5 to 1, 6 to 1 or even 7.5 to 1). On the one hand, it does not have a maximum speed limited by the displacement rule, whilst on the other hand it does not exhibit any significant planing behaviour since it does not generate a bow wave of any magnitude over which it can rise. Hence boats which behave in a semi-displacement mode do not in general suffer from the disadvantages of boats which behave either in a displacement or a planing mode of, on the one hand, lack of speed, or, on the other hand, lack of range.

It is to be noted in passing that, in certain relatively exceptional circumstances, boats of the semi-displacement type may exhibit some planing behaviour (although even in these circumstances they would not be described as operating in a planing mode). These circumstances include where the boat is running at very light payloads, light fuel loads and high speed, so that the hull may be subject to a substantial amount of lift.

The major disadvantage with a long slender semi-displacement boat is its tendency to be unstable, especially in roll. Such roll instability is commonly caused by two factors. Firstly, the very slenderness of the boat means that there is little resistance to roll. Secondly, such a boat tends to have a hull surface which is deliberately designed to avoid planing, and hence has few sharp edges such as might increase roll damping due to vortex shedding off those sharp edges.

One solution to such a problem has been adopted in catamaran or trimaran configurations. Here stability in roll is achieved by connecting two or more slender semi-displacement hulls so as to be spaced apart from each other.

Catamarans or trimarans suffer from two main disadvantages of relevance. Firstly, they can be awkward to manoeuvre and handle. Secondly, they can have no passive self-righting capability since they are equally stable inverted as they are the correct way up.

The present invention seeks to solve these problems.

According to the present invention, there is provided a boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending to a lesser depth than the central hull member, the ratio of the beam of the boat to the beam of the central hull member being no more than two.

The invention may not be restricted in all the aforesaid ways. For instance, the features that the central hull member has no flat surfaces below the waterline such as could support the boat in a planing mode, the feature that the ratio of the length of the central hull member to its beam is no less than 5 to 1, the feature that the auxiliary members extend to a lesser depth than the central hull member, and the feature that the ratio of the beam of the boat to the beam of the central hull member is no more than two are all optional.

As used herein, terms such as "length" and "beam" connote the waterline length or beam of the relevant member. "Waterline", in turn, may be defined in any convenient way. For instance, it would usually refer to the Mean Waterline Level of the boat, that is, when it is sitting on its marks, in its half-loaded state. If such data were not available, the term could refer to the light or unladen level of the boat, or indeed to any other convenient waterline datum level.

In certain circumstances, it may not be entirely clear from the boat cross-sections where the junction between the central hull member and the auxiliary members is located. For the avoidance of doubt, this junction would normally be recognisable by the location at which the curvature of the relevant cross-section changes (usually sharply) from zero or positive (on the central hull member) to negative (actually at or near the junction).

As discussed previously, the ratio of the length of the central hull member to its beam is termed the slenderness ratio. A slenderness ratio of no less than 5 to 1 defines a boat which operates in a semi-displacement mode.

By providing a boat of the semi-displacement type having the ratio of the beam of the boat to the beam of the central hull member being no more than two, many of the disadvantages of the known types of boat can be obviated. Because of the semi-displacement mode of operation, there need be no serious limitations on speed, fuel or payload. The auxiliary members can afford stability to the boat, but, because of the restrictions on their overall width and depth, the boat can be both easy to manoeuvre and handle and can also have a passive self-righting capability.

The restriction that the central hull member have no flat surfaces below the waterline such as could support the boat in a planing mode can ensure that the boat operates in a semi-displacement rather than planing mode.

Preferably, the ratio of the beam of the boat to the beam of the central hull member is no more than 1.6, 1.7 or 1.8. In fact, the narrower the auxiliary members are the better, provided that they afford sufficient buoyancy and lift to provide the requisite stability. In practice, the ratio of the beam of the boat to the beam of the central hull member is unlikely to be less than, say, 1.1 or 1.2.

Preferably, each auxiliary member is connected to the central hull member along substantially the entire length of the auxiliary member. This can afford a strong and convenient way of connecting the members, especially if they are formed integrally with one another.

Preferably, the auxiliary members are arranged to exert hydrodynamic lift on the boat. It will be understood that the term "hydrodynamic lift" refers to lift due to motion of the boat as opposed to lift caused by hydrostatic buoyancy forces. As discussed in more detail later, this can have several advantages in terms of the dynamic stability of the boat, and is therefore a most important feature.

Hence, in a related aspect of the invention, there is provided a boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending to a lesser depth than the central hull member, the auxiliary members being arranged to exert hydrodynamic lift on the boat.

Preferably, the resultant pitching moment of said hydrodynamic lift with respect to the centre of gravity is generally such as to raise the stern with respect to the bows (it being understood that there may be relatively exceptional circumstances in which this might temporarily not be the case). This feature is important in the enhancement of pitch stability. It can also give rise to a self-trimming function if, as is preferred, within given limits said hydrodynamic lift increases the further aft the centre of gravity is.

Preferably, the resultant rolling moment of the hydrodynamic lift of the two auxiliary members in combination is such as to oppose rolling of the boat. This feature is important in the enhancement of roll stability.

Preferably, each auxiliary member has a lifting surface arranged to exert hydrodynamic lift, and, for substantially the entire length of the auxiliary members aft of the centre of gravity of the boat, each lifting surface is either parallel with the base line of the central hull member, or angled generally upwardly with respect thereto when viewed in the aft to fore direction.

In this context, the base-line is preferably defined as the line tangential with the profile of the stern portion of the central hull member before the profile itself starts to curve upwardly towards the bows, although any suitable datum base-line may be employed.

Expressed another way, preferably, each auxiliary member has a lifting surface arranged to exert hydrodynamic lift, and, for substantially the entire length of the auxiliary members aft of the centre of gravity of the boat, the angle subtended by each lifting surface to a given waterline datum is greater than zero when viewed in the aft to fore direction.

This feature is important in the enhancement primarily of pitch stability. If, further, each lifting surface is angled generally upwardly fore of the centre of gravity for a given distance, then roll stability also can be particularly enhanced.

Preferably, the angle of each lifting surface with respect to the base-line increases generally in the aft to fore direction. This is important in the provision of a self-trimming capability. Expressed another way, preferably, each auxiliary member has a lifting surface arranged to exert hydrodynamic lift, and, for substantially the entire length of the auxiliary members, the angle subtended by each lifting surface to a given waterline datum increases generally in the aft to fore direction.

Preferably, if each auxiliary member has a lifting surface arranged to exert hydrodynamic lift, for at least a portion of the length of each lifting surface, when viewed in cross-section the lifting surface is inclined generally upwardly and inwardly. This feature can improve the dynamic roll and pitch stability of the boat, and can also provide improved turning performance, particularly if, as is preferred, the lifting surface is thus inclined at an angle of inclination which is greater adjacent the outermost portion of the lifting surface than it is adjacent the innermost portion. Preferably, the lifting surface is thus inclined at least aft of the centre of gravity of the boat, since it is here that the effect of the inclination is most advantageous.

Preferably, the profile of the prow of the boat above the waterline is angled rearwardly. With a semi-displacement type of boat this profile has been found to reduce wave-making and improve the penetration of the boat through the waves. This feature may also be provided independently.

The invention extends to a method of stabilising a boat using the auxiliary members as aforesaid.

The invention extends to an anchor assembly comprising an anchor and a support for the anchor, the support being moveable from a stowed to a deployed position on deployment of the anchor, and from the deployed to the stowed position on stowing of the anchor. Hence simply by stowing or deploying the anchor, the support as well as the anchor may be stowed or deployed. The anchor assembly may be provided independently.

Preferred features of the invention will now be described, by way of example only, with reference to the drawings, in which:

FIG. 1 is a side elevational view of a preferred embodiment of boat according to the present invention;

FIG. 2 is a corresponding rear elevational view;

FIG. 3 is a corresponding front view;

FIG. 4 is a corresponding plan view;

FIG. 5 is a side elevational view of the boat showing details of the interior layout;

FIGS. 6A to 6F are cross-sectional views of the boat, the cross sections being taken respectively at Stations A to F shown in FIG. 7;

FIG. 7 is a plan view corresponding to the side elevational view of FIG. 5;

FIGS. 9A to 9D are views of an anchor assembly forming part of the present invention, FIG. 9A being a front elevational view of the assembly in its stowed position, FIG. 9B being a corresponding side elevational view, FIG. 9C being a front elevational view of the assembly in its deployed position, and FIG. 9D being a corresponding side elevational view;

Figures 8, 10:
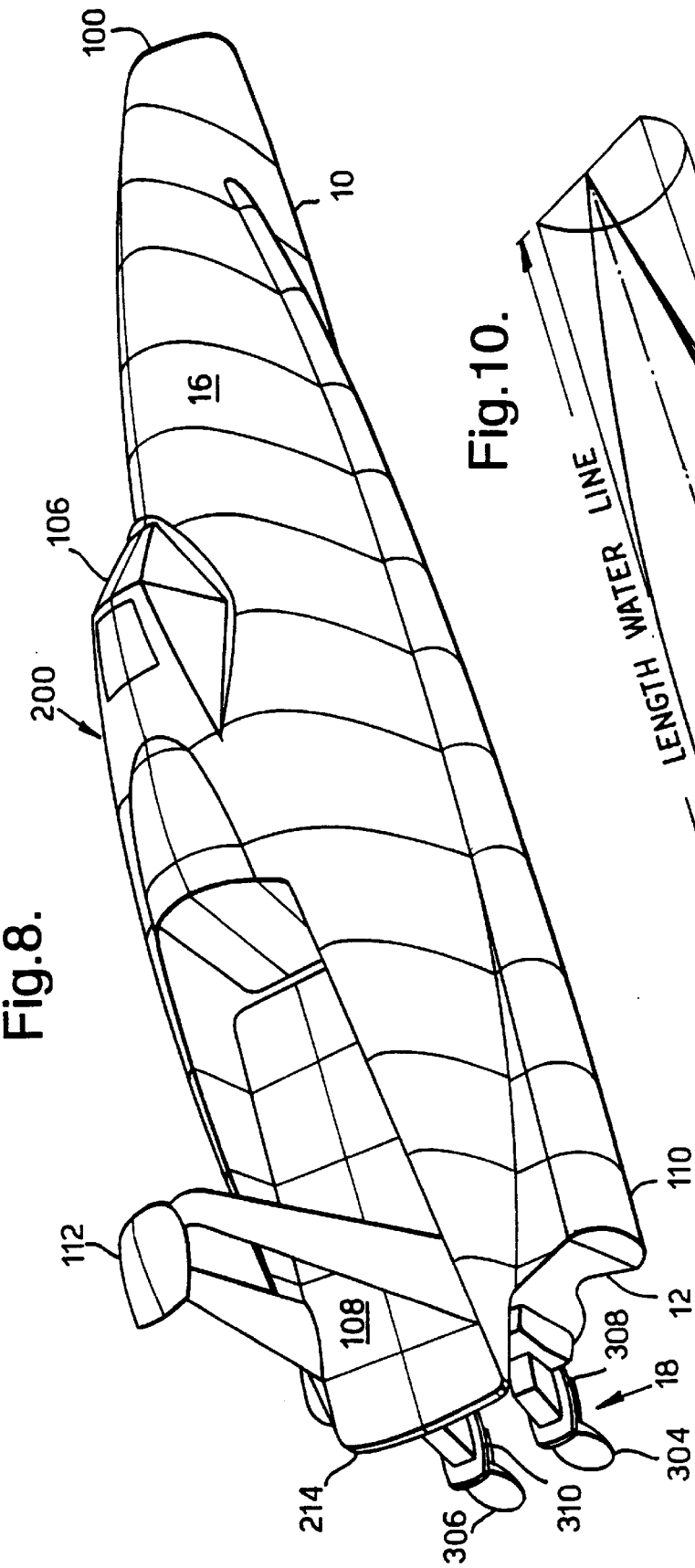
FIG. 8 is a perspective view of a variant of the preferred embodiment shown in FIGS. 1 to 7.
FIG. 10 is a diagram of a boat hull showing how the prismatic coefficient is calculated.

Referring to FIGS. 1 to 8, a preferred embodiment of boat according to the present invention comprises generally a central hull member 10, a respective auxiliary member 12, 14 extending along each side of the bull member 10 and connected thereto along the entirety of its length, a superstructure 16 formed generally integrally with the hull member and auxiliary members, and a propulsion unit 18.

The boat is of monocoque construction, the structural shell being manufactured using composite materials including Cotex (trade mark) non-crimp glass, carbon and/or Kevlar (trade mark) fibres in an epoxy resin matrix sandwiching an Airex (trade mark) foam core. The overall aim of the structural design of the boat is to eliminate any points of likely stress concentration in the boat and to ensure that the shell is uniformly strong.

To this end, there are no bulkheads in the boat which bear any substantial load, and those bulkheads which are provided (for example, to provide water-tight sections within the boat) are mounted on the shell via flexible mounts to ensure that they do not cause any areas of stress concentration.

The lay-up of the fibres is chosen so as to optimise the physical characteristics of the boat. This necessitates the identification of pressure zones and load paths in the structure. In putting the invention into practice, a finite element computer model was used for this purpose. Sets of possible input loads were input into the model. Such loads were principally dynamic loads produced by the reaction of the boat to waves when travelling at different speeds. The displacement of the boat, its speed and the sea state influence these loads. The model computed the pressure zones and load paths created by these loads. With a knowledge of these pressure zones and load paths, the shell was constructed using a cocktail of fibre types and weaves with known physical properties to match the pressure loads and load paths. Uni-directional fibres were aligned along load paths in the same way as wood fibres are aligned in a tree or muscle fibres in the body. By this technique the weight of the boat could be kept to a minimum.

The auxiliary members 12 and 14 are formed integrally with the remainder of the shell. The superstructure 16 extends out width-wise to the full extent of these members. Hence, due to the presence of the auxiliary members the superstructure has a greater width than the beam of the central hull member 10. The auxiliary members thus serve to increase the useable volume of the boat without concomitantly reducing the slenderness ratio of the central hull member. The auxiliary members could be inflatable instead of being formed integrally with the remainder of the shell.

One dynamic characteristic of the boat which is important from the structural point of view is the fact that the central hull member experiences local g-loads due to wave impact which are very significantly less than those normally experienced by a planing hull. This is partly due to the use of curved hull sections, and partly due to the behaviour of the boat in rough seas, in that it is much less prone to slamming problems. In fact, whilst a typical planing hull may experience g-loads of up to 6 g, the present central hull member may experience g-loads of up to only 1.5 g. This means that the structural shell need not be so strong, and hence that it can be substantially lighter than the equivalent planing hull structure.

Detailed features of the boat will now be described. With reference in particular to FIGS. 1 to 4, the boat includes externally firstly a prow 100 which is deformable so as to absorb the force of a slight impact. The prow is made in Urethane with cellular construction, having a large number of air spheres of roughly 5 cm diameter embedded in it. It is detachable so as to be easily replaceable. The profile of the prow above the waterline is angled rearwardly to reduce wave-making and improve the penetration of the boat through waves. The rearward cant also serves to reduce windage by reducing the projected area of the hull. This is important in a boat of this slenderness. It has been found that the optimal angle of cant is roughly 15 degrees to the vertical, although any angle between, for example, 5 and 45 degrees might suffice.

The boat also includes externally a flush composite fore hatch 102, a driver's hatch 104, a heated windscreen 106 made of laminated armour glass and capable of withstanding substantial water pressure, a rear sunken walkway 108, and a large, wrap-around, deformable fender 110 which, although it nominally lies above the waterline, can provide some roll stability for the boat, especially in cross seas, as well as providing protection for the primary structure; it can also be used as a walkway. The boat may also include one or more spray rails (not shown) extending along the hull, to reduce spray. As shown in FIG. 8, which is a slight variant of the boat shown in FIGS. 1 to 7, the boat may also include a stowable radar mast 112. Two lifting points 114 and 116 are provided fore and aft.

Finally, as regards external features, the boat includes an anchor assembly 120 as shown most clearly in FIGS. 9. This assembly comprises an anchor 122 and a support 124 for the anchor. The support takes the form of an "A" frame which is hingedly attached to the stern of the boat by brackets 126 and 128. It is pivotable between a stowed position as shown in FIGS. 9A and 9B in which it stands upright flush with the boat and a deployed position as shown in FIGS. 9C and 9D in which it projects perpendicularly outwardly from the stern. It is restrained from further downwards pivoting by two chains 130 and 132 extending between the stern of the boat and the distal end of the support 124. It is biassed into the deployed position by a torsion spring housed within the bracket 128. It further includes a pair of rollers 134 and 136 adjacent its distal end and through which the shaft 138 of the anchor shaft 138 is slidable. The anchor 122 and anchor chain 140 are moveable over a further roller 142 attached to the stern of the boat.

On deployment, as the anchor chain 140 is winched out, the anchor 122 moves together with its support 124 outwardly and downwardly until, as shown in FIGS. 9C and 9D, the chains 126 and 128 become taut, at which position the support 124 projects perpendicularly outwards from the stern. On further winching out of the anchor chain 140, the shaft 138 of the anchor slides downwards between the rollers 134 and 136, until it is eventually clear of the rollers. The anchor can then be further fed out, the anchor chain 140 riding on one or other of the rollers 134, 136. Stowage is the reverse of deployment.

The anchor assembly 120 allows the anchor 122 to be deployed well clear of the stern, so that the danger of the anchor chain 140 fouling the boat's propellers is reduced.

With reference particularly to FIGS. 5 to 7, the boat includes internally accommodation in a fully enclosed cockpit area 200 for a crew seated on pillion-type seats, together with two bunk beds 202 and 204 fore. The cockpit area 200 is sealed off by watertight bulkheads 206 and 208. Underneath the cockpit floor are two 250 gallon (1140 liter) foam filled fuel cells 210. Between the fuel cells 310 and the propulsion unit 18 is located a service area 212 accommodating batteries, fuel filters and like equipment. At the stern of the boat is provided an overhanging buoyancy chamber 214. This can provide reserve buoyancy and also protection for the propellers and drive mechanism.

The propulsion unit 18 includes two Seatek (trade mark) 64V 9D turbo-charged diesel engines 300 and 302 delivering 600 Horse power (430 kW) at 3150 rpm, driving respective surface-piercing four- or five-bladed propellers 304 and 306 via respective shallow Mercruiser/Keikhaefer VII (trade mark) "Z" drives 308 and 310. Surface-piercing propellers are used to avoid the substantial parasitic drag associated with the longer "Z" drives required to drive fully immersed propellers. The propellers are arranged to be contra-rotating in order to avoid any net rolling torque being generated. The rotational axis of the propellers is substantially aligned with the base-line of the central hull body 10. At speeds above roughly 15 knots, the waterline in the region of the propellers runs through this rotational axis. It will be understood that the waterline in this particular region is considerably lower when the boat is at speed than the general waterline level. The diesel engines 300 and 302 are mounted on trunnion-type mounts structured for 360 degree roll. The propulsion unit also includes a pair 312 of arrays of dorade air inlets. Access to the propulsion unit is via a pair of access hatches 314.

Alternative propeller arrangements may be provided. For example, one or more jet drives may be employed. A jet drive has the advantage that it does not impart any rolling torque to the boat.

The boat also includes two trim tabs (not shown) fixed to the rear of the auxiliary members and rotatable to alter the trim of the boat. The trim can also be altered by adjusting the thrust angle of the propellers and/or by shifting fuel between fuel cells.

The major performance features and characteristics of the boat will now be described with reference to FIGS. 1 to 8.

Weight. The boat displaces some five metric tonnes excluding fuel or payload and some 9 tonnes fully laden, with a payload of 2.5 tonnes.

Range. The boat has a projected range of 1000 nautical miles at 45 knots or 850 nautical miles at 55 knots.

Speed. The boat has a projected sprint speed of 60 knots.

Length. The length of the boat is 15 meters. Boats of considerably longer or shorter lengths would also be feasible. It has, for example, been demonstrated at a theoretical level that a boat of 50 meters length and similar configuration should be able to make an un-refuelled crossing of the Atlantic at an average speed of roughly 60 knots.

Beam. The overall beam of the boat is 2.8 meters including the auxiliary members 12 and 14 and the fender 110, and 2.4 meters excluding the fender.

Draught. The Mean Waterline Level draught of the boat is 0.45 meters.

Height. The height of the boat is 2.3 meters.

Complement. Ten crew members seated, with four standby crew in bunks.

Centre of gravity. In general terms, the centre of gravity of the boat would usually be relatively far aft, further aft than midships and usually in the range of two-thirds to three-quarters of the length of the boat aft. It is largely dictated by the position of the propulsion unit, which in the present configuration is relatively far aft in order to leave the midships area free for crew accommodation. This has been found to be an efficient layout. With this layout, for the preferred embodiment the centre of gravity is 2 or 3 meters fore of the propulsion unit, dependent on the amount of fuel. The centre of gravity corresponding to the Mean Waterline Level is shown in FIG. 5, designated as CG. The other major source of weight in the boat, the fuel cells 210, is placed as close to the centre of gravity as possible, in order to minimise the moment of inertia of the boat in pitch. The weight of the major components (such as fuel cells and propulsion unit) is located as low in the boat as possible to reduce rolling.

Angle of incidence of boat (trim angle). The preferred embodiment of boat is arranged to have an angle of incidence (defined with reference to the base-line 150 of the central hull member 10) in the region of 5 degrees over its operating range of speeds.

An angle of incidence, say, in the range 2 to 10 degrees might in many circumstances be satisfactory. However, if the angle of incidence is much less than five degrees, then drag may increase unacceptably due to the extra wetted area of the boat. If the angle is much greater than five degrees, then directional stability may be lost; also the effective slenderness ratio of the central hull member would increase, giving rise to an increase in pressure drag.

If the angle is nearer ten degrees than 2 degrees, then the bows may often ride completely out of the water. Significantly higher angles may of course be experienced temporarily, such as when the boat hits a wave.

Planform of the central hull member. The planform of the central hull member 10 is dictated by the following factors:

1) The centre of buoyancy should be located correctly with respect to the centre of gravity of the boat so that the boat trims at the correct angle of incidence. This requires that buoyancy must be correctly distributed along the central hull member.

2) The central hull member should have sufficient buoyancy to support the full range of displacement of the boat.

3) The bow sections should be sufficiently fine (this is discussed in more detail under "entry angle" below).

In practice, the planform shown in FIG. 1 is considered to be near optimal for the preferred embodiment of boat. However, if, say, a more slender hull were envisaged, it might be possible to design the hull with a degree of boat-tailing.

Slenderness ratio of the central hull member. In general terms, the slenderness ratio of the central hull member should be greater than 5 to 1, so that the boat operates in a semi-displacement mode. In the preferred embodiment, the slenderness ratio is 7.2 to 1.

Prismatic coefficient of the central hull member. The prismatic coefficient of the central hull member 10 is an important parameter since it determines the cross-sectional shape of the hull. Its definition is illustrated with reference to FIG. 10. It is defined as the ratio of the volume of displacement to the volume of a particular prism which surrounds it. The prism is formed by the waterline length of the boat and the hull section having the largest area up to the waterline.

For the preferred embodiment of boat the coefficient is 0.413, but the coefficient may in general terms lie in the range, say, 0.35 to 0.50. All these figures relate to the Mean Waterline Level of the boat.

Such a relatively low prismatic coefficient for the preferred embodiment indicates that the central hull member thins relatively rapidly towards the bows. This allows this member to have good wave-piercing abilities.

Cross-sectional shape of the central hull member. The cross-sectional shape of the central hull member 10 is dictated largely by the prismatic coefficient, by structural considerations and by the requirement that the boat does not enter into a planing mode under normal conditions. Hence the central hull member has no flat panels (aside from the transom), both in order that it may have structural rigidity and in order that it does not plane easily. All the sections have positive curvature (that is, they are not convex) and possess no regions of reflex. Such sectional shapes also afford a soft landing in waves, as opposed to the slamming experienced by planing hulls.

The precise sectional shapes can be seen most clearly in FIGS. 6. The aft sections are each in fact of nearly constant curvature (that is, nearly a segment of a circle), whilst the fore sections are increasingly elliptical.

Entry angle. The entry angle (in other words, one half of the angle subtended by the bows of the central hull member 10, when viewed in planform) is as fine as possible, to permit the bows to pierce through the waves with minimum resistance. It has been found, in fact, that the entry angle is one of the critical factors in the design of the boat. An entry angle in the range of 3 to 10 degrees has been found to be optimal. The entry angle of the preferred embodiment is actually 7 degrees.

Superstructure. The superstructure 16 is shaped fore of the cockpit area 200 to prevent the bows becoming completely buried in a wave, with the possible disastrous consequence that the boat might begin to submarine and possibly sink. To this end this region of the superstructure is convex, being of elliptical cross-section. Submarining might be a severe problem if the region were, for example, flat.

The superstructure is also designed so that the boat is passively self-righting. This is achieved by making it enclosed and by careful distribution of the buoyancy within the superstructure.

Extent of the auxiliary members. The most critical portion of the auxiliary members 12 and 14 is that aft of the centre of gravity, as will be explained later. As can be seen in, for example, FIG. 1, the auxiliary members on the preferred embodiment do actually extend substantially the entire length of the central hull member 10. However, they could fulfil many of their functions if they were to extend only from the centre of gravity aft, say, 10 or 20% of the waterline length of the boat. In more slender vessels having a centre of gravity near midships, another possibility is for the auxiliary members to extend fore and aft of midships, say, 20 or 30% of the waterline length of the boat in each direction.

Width and area of the auxiliary members. The proportions of the auxiliary members 12 and 14 are most important to the correct operation of the boat. In the preferred embodiment the auxiliary members taper in width from stern to bows. At the stern, the width of each such member is roughly one third of the half-width of the central hull member at any particular station. At midships, the relevant width ratio is one quarter, whilst adjacent the bows the ratio is one sixth. However, the width of the auxiliary members might be as great as, for instance, one half of the half-width of the central hull member at the relevant station.

When viewed in plan, the combined area of the auxiliary members is 22.6% of the overall area of the boat for the preferred embodiment. However, a percentage as great as, for example, 30% or 35% or as little as 10% might in some circumstances be appropriate.

Depth of the auxiliary members. The auxiliary members 12 and 14 are so situated that only the portion aft of the centre of gravity is wetted when the boat is light (no fuel and no payload) and static, although the auxiliary members might still function adequately if an even smaller portion aft of the centre of gravity were wetted (perhaps the rear half of the portion aft of the centre of gravity). Thus, even at this extreme condition of loading the auxiliary members preferably provide static stability to the boat.

Angle of incidence of the auxiliary members. The angle of incidence of the lifting surfaces (that is, the undersurfaces) of the auxiliary members 12 and 14 is particularly important, since this determines the amount of lift they can generate. Each lifting surface is angled upwardly with respect to the base-line of the hull central member 10 when viewed in the aft to fore direction. In this context, the base-line is defined as the line tangential with the profile of the stern portion of the central hull member, before the profile itself starts to curve upwardly towards the bows. The baseline is shown dotted in FIG. 1, designated 150. (For comparison, the Mean Waterline Level is designated 152.) Further, the angle of each lifting surface with respect to the base-line increases in the aft to fore direction. A different way of stating the requirements on the angle of incidence of the auxiliary members is that, at each station, a line tangential to the lifting surface subtends a non-negative angle with respect to a line tangential to the profile of the hull member at that particular station, and that furthermore the subtended angle increases from aft to fore.

In the preferred embodiment, relative to the base-line, the angle of the lifting surfaces increases from between zero and half a degree at the stern to between five and seven degrees near the bows. Angles ranging up to, say, 10 degrees or even more may be appropriate, certainly at the bows and possibly even at the stern.

Shape of the auxiliary members. The precise shape of the auxiliary members 12 and 14 is not believed to be critical. The junction between the central hull member and each auxiliary member is preferably sharp, especially aft of the centre of gravity, in order to maximise the hydrodynamic lift which they exert. Again, the outer, lower edges of the auxiliary members, bordering the lifting surfaces, are preferably sharp in order to maximise the hydrodynamic roll damping caused by vortex shedding. The lifting surfaces may be substantially flat when viewed in cross-section, or may be angled or inclined generally slightly upwardly and inwardly, again especially aft of the centre of gravity. They may even be moderately convex, so that the angle of inclination is greater at the outer edge of the lifting surface than at its inner edge.

Figure 13:
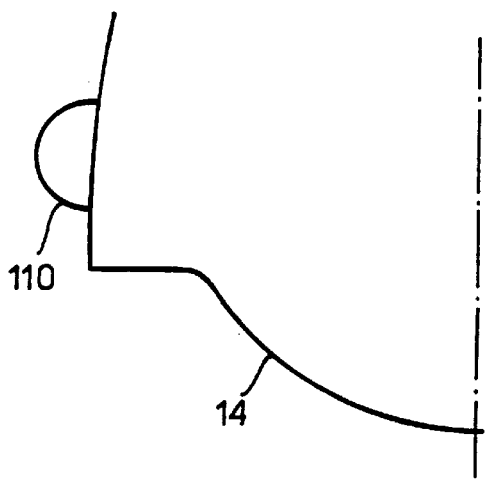
FIGS. 13A and 13B are respectively an enlarged partial view corresponding to the cross-sectional shape of FIG. 6E and a similar enlarged partial view of a modified version of that shape.
Figure 13:
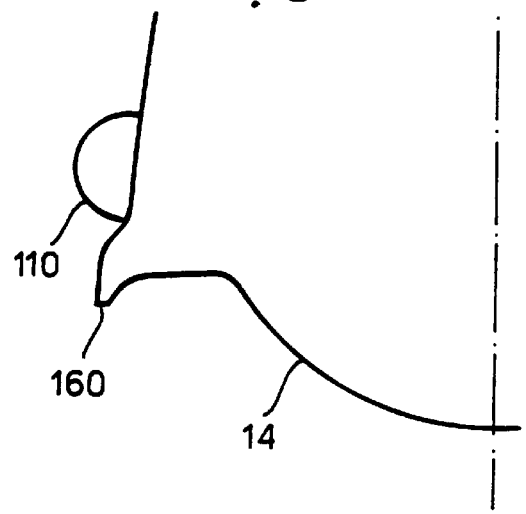
Figure 14:
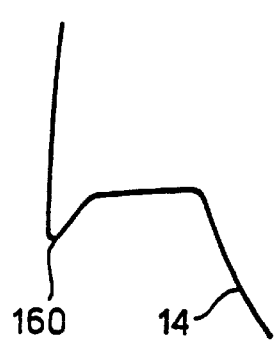
FIGS. 14A to 14C are enlarged partial views of three further modified versions of the cross-sectional shape of FIG. 6E.
Figure 14:
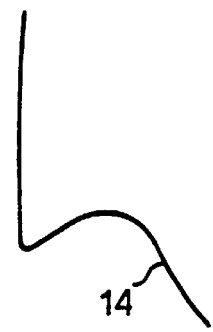
Figure 14:
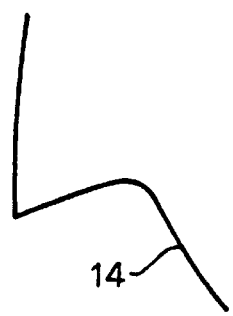

More detailed information concerning the cross-sectional shape of the auxiliary members is provided in FIGS. 13 and 14. FIG. 13A is an enlarged version of the cross-sectional shape at Station E shown in FIG. 6E. This shows a flat lifting surface which subtends an angle of approximately 90° to the side of the relevant auxiliary member.

FIG. 13B illustrates a modified version of the shape illustrated in FIG. 13A which incorporates the aforementioned upward and inward inclination. By comparison with the shape shown in FIG. 13A, a protuberance 160 has been added so that the lifting surface has an inclined outer portion which affords the required inclination to the lifting surface as a whole.

FIGS. 14A, 14B and 14C illustrate three other possible shapes for the lifting surface. The first two shapes (FIGS. 14A and 14B) have the convexity referred to previously, with the shape of FIG. 14A exhibiting a distinct protuberance 160 to provide the convexity, whilst the shape of FIG. 14B has a more uniform curvature, there being a gentle radiussing adjacent the junction between the auxiliary member and the central member. The third shape (FIG. 14C) illustrates a cross-section which is flat, but angled slightly upwardly and inwardly, say at an angle of between 5 and 25 (preferably between 10 and 20) degrees.

It can be seen that all the shapes achieve the desired upward and inward inclination when viewed in cross-section, in that the outer tip of the lifting surface is at a lower level in the water than the innermost portion of the surface.

The shapes illustrated in FIGS. 13 and 14 are in the preferred embodiment roughly geometrically similar along the length of the relevant auxiliary member. In other words, for instance with reference to the shape of FIG. 13B, the shape of the protuberance 160 remains roughly the same along the length of the member, with the dimensions of the protuberance remaining in the same proportion to the dimensions of the lifting surface as a whole.

If the lifting surfaces of the auxiliary members are provided with the upward and inward inclination mentioned above, it has been found pursuant to the present invention that the dynamic lift which they generate is greater than the lift generated by an equivalent completely level lifting surface. Viewed simply, the inclination reduces the outward spillage of water from the lifting surfaces, and hence increases lift. It has been found that this enhanced lift can be best achieved by the radiussed shape of lifting surface shown in FIG. 14B. However, more generally, any of the "hooked" profiles of FIGS. 13B, 14A or 14B are considered to be particularly effective. In other words the shape is preferably one whose upward inclination decreases generally in the inward direction.

It has further been found that the enhanced lift can be achieved by the inclination of the lifting surfaces not only when the boat is moving forwards in a straight line but also when the boat is turning. In this latter case, the flow of water past the lifting surfaces is not parallel with those surfaces but is transverse to them on account of the sideways, outwards slippage of the aft region of the boat as the turn is negotiated. In these circumstances, it has been found that the lift generated, especially by that lifting surface which is inboard of the turn, is considerably increased over the lift which would be generated by a completely level lifting surface. In particular, the flow of water outwardly over the inboard lifting surface generates a considerable amount of lift. Furthermore, the boat leans into the turn, since the thrust of the engines acts below the boat's centre of gravity. This further increases the angle of attack of the inboard lifting surface hence further increasing the lift which it generates.

Further still, it has been found pursuant to the present invention that, if the lifting surfaces of the auxiliary members are provided with the upward and inward inclination mentioned above, this can substantially increase lateral drag on the boat when the boat is negotiating a turn, most significantly in the further aft portion of the boat (that is, aft of the centre of gravity) where the auxiliary members are largest. This increase in lateral drag can substantially improve the turning circle of the boat. The increase is most marked for the inboard auxiliary member, which effectively "digs in" to the water as the boat rolls into the turn. A boat made according to the preferred embodiment described above, with the shape of lifting surface as illustrated in FIG. 13B, has the capability of turning in roughly three times its own length.

Functions of the auxiliary members. The auxiliary members serve several functions, as follows:

1) Static stability. The auxiliary members 12 and 14 are arranged to afford a degree of static roll stability (and, to a lesser extent, static pitch stability) to the boat. This is achieved by assuring that in all conditions of loading the auxiliary members are at least partly wetted. Thus the auxiliary members do not need to extend to any particularly great depth. For example, at the Mean Waterline Level their depth below this level may be less than one half, usually less than one third or one quarter, of the depth of the central hull member. This may be true both as regards the greatest depth of the auxiliary members and the central hull member, and also as regards the situation at individual stations. Hence, they do not have any particularly great buoyancy. Their combined buoyancy would nearly always be less than the buoyancy of the central hull member.

It is to be noted in this context that the depth of the auxiliary members in the preferred embodiment is not so great as to induce the boat from a semi-displacement mode of operation into a mode in which it planes fully on the lifting surfaces, at least not under mean or normal operating conditions. The primary purpose of the auxiliary members is to provide stability, both statically and dynamically; they are not intended to be the primary lifting surfaces on the boat.

2) Dynamic roll stability. Dynamic roll stability can be provided by the auxiliary members in circumstances where the resultant rolling moment of the hydrodynamic lift of the two auxiliary members in combination is such as to oppose rolling of the boat. This can be achieved where the lift force exerted by the lifting surfaces reduces on the auxiliary member which is rolling out of the water, and increases on the member which is rolling into the water. This in turn amounts to a requirement that the lifting surfaces have a positive angle of incidence relative to the waterline over the operational speed and loading range of the boat, so that the wetted area of the lifting surface which is rolling out of the water decreases whilst the converse is true for the opposite lifting surface.

In order to provide the requisite roll stability over a wide range of roll and pitch angles, a significant portion of the length of the lifting surfaces may be required to be brought into operation, including quite possibly portions well fore of the centre of gravity, perhaps up to midships or even beyond.

It will be appreciated from the foregoing section entitled "Shape of the auxiliary members" that dynamic roll stability can be enhanced by employing an upwardly and inwardly inclined lifting surface, for instance of the type shown in FIG. 13B or FIG. 14.

3) Dynamic pitch stability. The auxiliary members can provide a degree of dynamic pitch stability. In this case, it is the dynamic behaviour of the lifting surfaces aft of the centre of gravity which is most important. At speed, a dynamic lift force will be exerted on the central hull member tending to pitch the bows upwardly. This force will be augmented by the thrust from the propulsion unit. The pitching moment thus caused is counter-acted by the lift force exerted by the lifting surfaces aft of the centre of gravity, to maintain the boat as a whole at a relatively stable angle of incidence. For example, as the bows pitch up, the countervailing moment exerted by the lifting surfaces increases, and conversely as the bows pitch down, thus enhancing dynamic pitch stability.

Hence, in order to provide a degree of dynamic pitch stability, that portion of each lifting surface aft of the centre of gravity is the most important. Indeed, no pitch stability would be afforded at all by the auxiliary members if, at a normal angle of incidence of the boat, that portion of each lifting surface fore of the centre of gravity exerted more lift than that portion aft. For this reason, the angle of each lifting surface progressively increases from aft to fore, especially fore of the centre of gravity, so that the lift exerted by the lifting surfaces fore of the centre of gravity at a normal angle of incidence is not substantial (since the surfaces rapidly rise out of the water fore of the centre of gravity).

This progressive increase in the aforementioned angle also has a further advantage. At significant negative pitch angles for the boat, when the more aft portions of the lifting surfaces are not producing substantial lift, the lifting surfaces fore of the centre of gravity can actually produce, temporarily, more lift than those aft because of the difference in angle of incidence of the lifting surfaces between fore and aft. This can assist the bows to rise to their normal attitude.

In order to achieve the correct counterbalance between the positive and negative pitching moments described above, it will be understood that the area, position and angle of incidence (amongst other factors) of the auxiliary members must all be chosen carefully.

It will be appreciated from the foregoing section entitled "Shape of the auxiliary members" that dynamic pitch stability can be enhanced by employing an upwardly and inwardly inclined lifting surface, for instance of the type shown in FIG. 13B or FIG. 14.

4) Self-trim capability. The auxiliary members are capable of trimming the boat automatically within given limits, at least within the expected range of locations of the centre of gravity. (It will be appreciated that the centre of gravity can move quite substantially, for example, as fuel is used up.) This self-trim capability operates in a fashion akin to the manner in which the dynamic pitch stability is provided. As the centre of gravity shifts and hence the angle of incidence of the boat varies, the moment exerted by the lifting surfaces about the centre of gravity varies in compensation. In order that the auxiliary members can have a self-trim capability, it is important that they extend beyond the expected range of locations of the centre of gravity, both fore and aft. This would usually amount to a requirement that the auxiliary members extend both fore and aft of the Mean Waterline Level centre of gravity at least 10% of the length of the boat, preferably at least 15 or 20%.

5) Drag reduction. At speed, since the auxiliary members tend to lift the boat somewhat, the beam of the central hull member reduces, as does its wetted area. This can give rise to reductions in both pressure and skin-friction drag. However, even with the lift provided by the auxiliary members, the boat still operates in a semi-displacement mode. At full speed, the volume of water displaced by the boat would rarely be less than, say, one half or two thirds of the static volume of water displaced.

It should be emphasised that throughout the performance envelope of the boat, even at full speed and light payload, at least a portion of at least one of the auxiliary members (usually both unless the boat is turning) is arranged to be wetted and hence provide some lift. The boat does not have a central hull member which can (within the performance envelope of the boat) by itself support the boat in a planing mode. In other words, whilst the boat may rise somewhat in the water at speed, this is achieved by a combination of the lift generated by the central hull member and the auxiliary member(s).

If a particularly low drag configuration is required for the boat, say if it is desired to travel at sprint speed, then the boat may be driven with the bows more than usually high out of the water by making suitable trimming adjustments. Even in these extreme circumstances, however, typically the rear 20 to 40% of the length of the auxiliary members would be wetted.

6) Spray reduction. One of the main purposes of the furthest fore portions of the auxiliary members is to reduce spray.

7) Reserve buoyancy. A secondary function of the auxiliary members is to provide reserve buoyancy.

8) Turning performance. The auxiliary members serve to enhance the turning performance of the boat in two different ways. Firstly, as the boat rolls into a turn the inboard member digs in to the water to increase the lateral drag and improve the turning circle, as described above. Secondly, in that the inboard member especially generates a substantial amount of lift as well as drag during a turn, the auxiliary members can generate a righting roll moment to counteract the roll moment generated by the propellers during the turn. If correctly chosen, the righting moment and the moment generated by the propellers can balance each other such that the boat neither leans excessively into the turn nor leans outwardly away from the turn. It is usually preferred that the boat leans somewhat into the turn, preferably at a similar angle to the angle of lean experienced by passengers on the boat.

Figure 11:
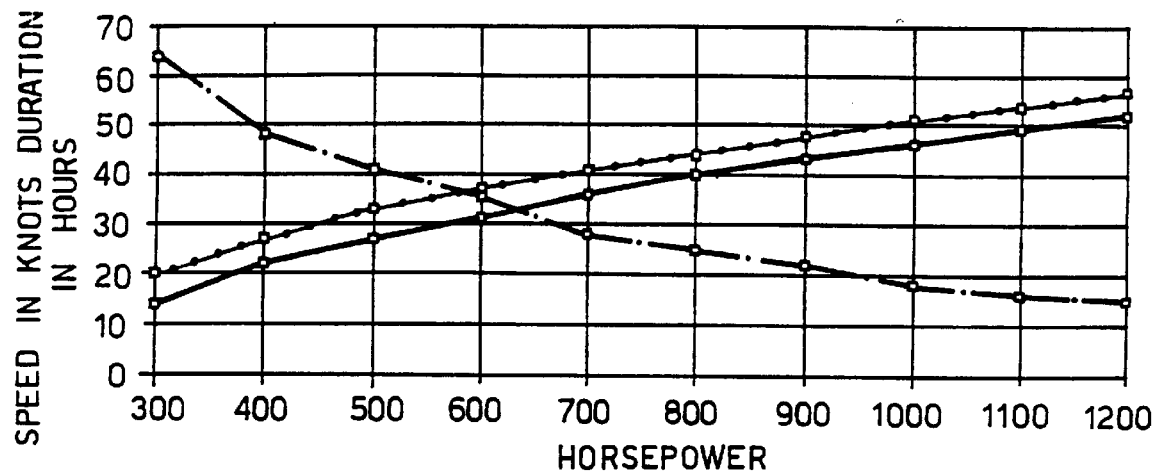
FIG. 11 is a graph showing the projected performance envelope of the preferred embodiment of boat.
Figure 12:
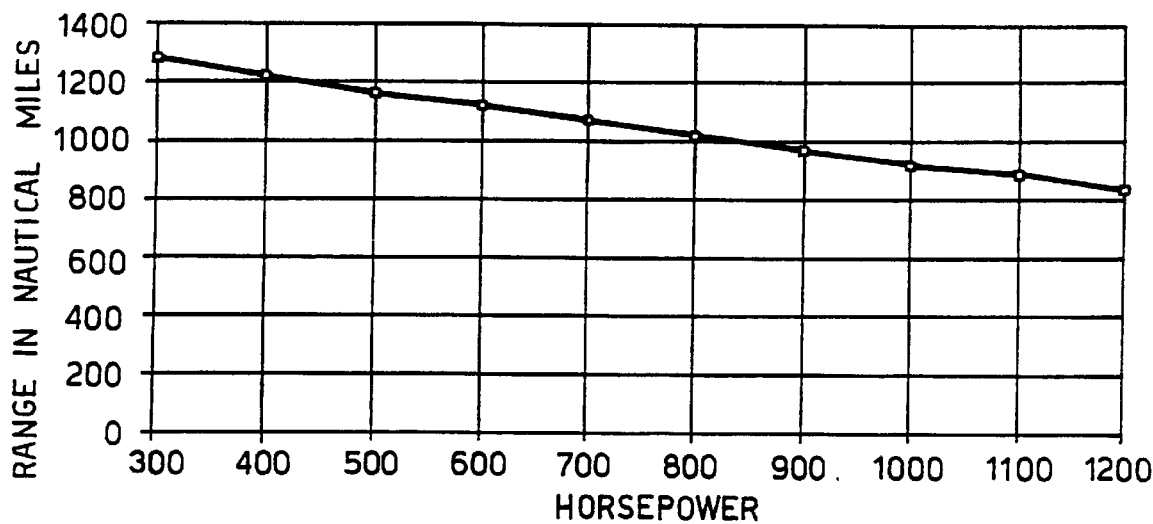
FIG. 12 is a graph showing the projected range of the boat.

Turning now to FIGS. 11 and 12, which provide predictions concerning the performance of the preferred embodiment of boat, firstly FIG. 11 shows predictions of speed (in knots) and duration (in hours) against power (in Horse power). The solid line represents the speed for maximum displacement, whilst the dotted line represents the speed for minimum displacement. The chain dotted line represents duration. FIG. 12 shows a prediction of range (in nautical miles) against power (in Horse power). As described above, the boat has a maximum available power of 1200 Horse power (860 kW).

Some of the main advantages of the preferred embodiment of boat described above are as follows:

Very good rough weather performance due partly to the use of convex hull surfaces and partly to the auxiliary members High payload capacity with little reduction in performance Longer range at higher speeds than most conventional craft due to the slenderness of the hull Speed roughly proportional to throttle setting, since no power surge is required to make the boat plane Relatively light weight due to the use of convex hull surfaces and the relatively low local loading of the structure Passive self-righting capability Low radar signature Up to 20% less fuel consumption than a conventional planing power boat It will of course be understood that the present invention has been described above purely by way of example, and modifications of detail can be made within the scope of the invention.

Each feature disclosed in the description, and (where appropriate) the claims and drawings may be provided independently or in any appropriate combination.

What is claimed is:

1. A boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending to a lesser depth than the central hull member, the auxiliary members being arranged to exert hydrodynamic lift on the boat, wherein the depth of the auxiliary members is such that, in use, under static conditions, both auxiliary members are at least partly wetted.

2. A boat according to claim 1 wherein the ratio of the beam of the boat to the beam of the central hull member is no more than 1.6.

3. A boat according to claim 1 wherein each auxiliary member is connected to the central hull member along substantially the entire length of the auxiliary member.

4. A boat according to claim 1 wherein the resultant pitching moment of said hydrodynamic lift with respect to the centre of gravity is generally such as to raise the stern with respect to the bows.

5. A boat according to claim 1 wherein within given limits said hydrodynamic lift increases the further aft the centre of gravity is.

6. A boat according to claim 1 wherein the resultant rolling moment of the hydrodynamic lift of the two auxiliary members in combination is such as to oppose rolling of the boat.

7. A boat according to claim 1 wherein each auxiliary member has a lifting surface arranged to exert hydrodynamic lift, and, for substantially the entire length of the auxiliary members aft of the centre of gravity of the boat, neither lifting surface is angled generally downward with respect to the base-line of the central hull member when viewed in the aft to fore direction.

8. A boat according to claim 7 wherein the angle of each lifting surface with respect to the base-line increases generally in the aft to fore direction.

9. A boat according to claim 1 wherein each auxiliary member has a lifting surface arranged to exert hydrodynamic lift, and, for substantially the entire length of the auxiliary members aft of the centre of gravity of the boat, the angle subtended by each lifting surface to a given waterline datum is greater than zero when viewed in the aft to fore direction.

10. A boat according to claim 1 wherein each auxiliary member has a lifting surface arranged to exert hydrodynamic lift, and, for substantially the entire length of the auxiliary members, the angle subtended by each lifting surface to a given waterline datum increases generally in the aft to fore direction.

11. A boat according to claim 1 wherein each auxiliary member has a lifting surface arranged to exert hydrodynamic lift, for at least a portion of the length of each lifting surface, when viewed in cross-section the lifting surface is inclined generally upwardly and inwardly.

12. A boat according to claim 11 wherein the lifting surface is thus inclined at an angle of inclination which is greater adjacent the outermost portion of the lifting surface than it is adjacent the innermost portion.

13. A boat according to claim 11 wherein the lifting surface is thus inclined at least aft of the centre of gravity of the boat.

14. A boat according to claim 1 wherein the profile of the prow above the waterline is angled rearwardly.

15. A boat comprising a central hull member, such member having no flat surfaces below the waterline such as could support the boat in a planing mode, the ration of the length of such member to its beam being no less than 5 to 1, and a respective auxiliary member connected to each side of the central hull member and extending therealong, the auxiliary members extending to a lesser depth than the central hull member, the auxiliary members being arranged to exert hydrodynamic lift on the boat and wherein the resultant pitching moment of said hydrodynamic lift with respect to the centre of gravity is generally such as to raise the stern with respect to the bows.

16. A boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending a lesser depth than the central hull member, the auxiliary members being arranged to exert hydrodynamic lift on the boat, wherein the boat has a superstructure and the superstructure is convex in the region of the bows of the boat.

17. A boat according to claim 16, wherein the boat includes a cockpit area and the superstructure is generally convex fore of the cockpit area.

18. A boat according to claim 16, wherein the superstructure is of generally elliptical cross-section.

19. A boat according to claim 16 wherein the ratio of the beam of the boat to the beam of the central hull member is no more than 1.6.

20. A boat according to claim 16 wherein the resultant pitching moment of said hydrodynamic lift with respect to the centre of gravity is generally such as to raise the stern with respect to the bows.

21. A boat according to claim 16 wherein within given limits said hydrodynamic lift increases the further aft the centre of gravity is.

22. A boat according to claim 16 wherein each auxiliary member has a lifting surface arranged to exert hydrodynamic lift, and, for substantially the entire length of the auxiliary members aft of the centre of gravity of the boat, neither lifting surface is angled generally downwardly with respect to the base-line of the central hull member when viewed in the aft to fore direction.

23. A boat according to claim 16 wherein each auxiliary member has a lifting surface arranged to exert hydrodynamic lift, and, for substantially the entire length of the auxiliary members aft of the centre of gravity of the boat, the angle subtended by each lifting surface to a given waterline datum is greater than zero when viewed in the aft to fore direction.

24. A boat according to claim 22 wherein the angle of each lifting surface with respect to the base-line increases generally in the aft to fore direction.

25. A boat according to claim 16 wherein each auxiliary member has a lifting surface arranged to exert hydrodynamic lift, and, for substantially the entire length of the auxiliary members, the angle subtended by each lifting surface to a given waterline datum increases generally in the aft to fore direction.

26. A boat according to claim 16 wherein each auxiliary member has a lifting surface arranged to exert hydrodynamic lift, and, for at least a portion of the length of each lifting surface, when viewed in cross-section the lifting surface is inclined generally upwardly and inwardly.

27. A boat according to claim 16 wherein the profile of the prow above the waterline is angled rearwardly.

28. A boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending to a lesser depth than the central hull member, the auxiliary members being arranged to exert hydrodynamic lift on the boat, wherein the boat has a prow and the profile of the prow above the waterline is angled rearwardly.

29. A boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending to a lesser depth than the central hull member, the auxiliary members being arranged to exert hydrodynamic lift on the boat, wherein, when viewed in plan, the combined area of the auxiliary members is not more than 30% of the overall area of the boat.

30. A boat according to claim 29 wherein each auxiliary member is connected to the central hull member along substantially the entire length of the auxiliary member.

31. A boat according to claim 29 wherein the resultant pitching moment of said hydrodynamic lift with respect to the centre of gravity is generally such as to raise the stern with respect to the bows.

32. A boat according to claim 29 wherein each auxiliary member has a lifting surface arranged to exert hydrodynamic lift, and, for substantially the entire length of the auxiliary members aft of the centre of gravity of the boat, neither lifting surface is angled generally downwardly with respect to the base-line of the central hull member when viewed in the aft to fore direction.

33. A boat according to claim 32 wherein the angle of each lifting surface with respect to the base-line increases generally in the aft to fore direction.

34. A boat according to claim 29 wherein each auxiliary member has a lifting surface arranged to exert hydrodynamic lift, and, for substantially the entire length of the auxiliary members aft of the centre of gravity of the boat, the angle subtended by each lifting surface to a given waterline datum is greater than zero when viewed in the aft to fore direction.

35. A boat according to claim 29 wherein each auxiliary member has a lifting surface arranged to exert hydrodynamic lift, and, for substantially the entire length of the auxiliary members, the angle subtended by each lifting surface to a given waterline datum increases generally in the aft to fore direction.

36. A boat according to claim 29 wherein each auxiliary member has a lifting surface arranged to exert hydrodynamic lift, and, for at least a portion of the length of each lifting surface, when viewed in cross-section the lifting surface is inclined generally upwardly and inwardly.

37. A boat according to claim 29 wherein the profile of the prow above the waterline is angled rearwardly.

38. A boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending to a lesser depth than the central hull member, the auxiliary members being arranged to exert hydrodynamic lift on the boat, wherein the entry angle of the boat is in the range of 3 to 10 degrees.

39. A boat according to claim 38 wherein the entry angle is 7 degrees.

40. A boat according to claim 38 herein the prismatic coefficient of the central hull member is in the range of from 0.35 to 0.50.

41. A boat according to claim 38, where in the centre of gravity of the boat is in the range of two-thirds to three-quarters of the length of the boat aft.

42. A boat according to claim 38 wherein the resultant pitching moment of said hydrodynamic lift with respect to the centre of gravity is generally such as to raise the stern with respect to the bows.

43. A boat according to claim 38 wherein within given limits said hydrodynamic lift increases the further aft the centre gravity is.

44. A boat according to claim 38 wherein the profile of the prow above the waterline is angled rearwardly.

45. A boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members extending to a lesser depth than the central hull member, the auxiliary members being arranged to exert hydrodynamic lift on the boat, wherein each auxiliary member has a lifting surface arranged to exert hydrodynamic lift and, for at least a portion of the length of each lifting surface, when viewed in cross-section the lifting surface is inclined generally upwardly and inwardly.

46. A boat according to claim 45 wherein the lifting surface is thus inclined at an angle of inclination which is greater adjacent the outermost portion of the lifting surface than it is adjacent the innermost portion.

47. A boat according to claim 45 wherein the lifting surface is thus inclined at least aft of the centre of gravity of the boat.

48. A boat according to claim 45 wherein the profile of the prow above the waterline is angled rearwardly.

49. A boat comprising a central hull member, such member having no flat surfaces below the waterline such as could support the boat in a planing mode, the ratio of the length of such member to its beam being no less than 5 to 1, and a respective auxiliary member connected to each side of the central hull member and extending therealong, the auxiliary members being arranged to exert hydrodynamic lift on the boat, wherein the resulting pitching moment of said hydrodynamic lift with respect to the centre of gravity is generally such as to raise the stern with respect to the bows.

50. A boat according to claim 49 wherein the auxiliary members extend below the Mean Water Level of the boat.

51. A boat according to claim 49 wherein the ratio of the beam of the boat to the beam of the central hull member is no more than two.

* * * * *